US007013981B2

(12) United States Patent
Goode

(10) Patent No.: US 7,013,981 B2

(45) Date of Patent: Mar. 21, 2006

(54) TRIM GAUGE FOR FARRIERS

(76) Inventor: George Goode, 2230 N. Kimerly, Tucson, AZ (US) 85749

( * ) Notice: Subject to any disclaimer, the term of this patent is extended or adjusted under 35 U.S.C. 154(b) by 10 days.

(21) Appl. No.: 10/845,738

(22) Filed: May 13, 2004

(65) Prior Publication Data

US 2004/0244995 A1 Dec. 9, 2004

Related U.S. Application Data

(60) Provisional application No. 60/470,266, filed on May 13, 2003.

(51) Int. Cl.
*A01L 11/00* (2006.01)

(52) U.S. Cl. .......................... 168/45; 168/48.1; 33/195

(58) Field of Classification Search .................. 168/45, 168/48.1, 48.2; 33/195
See application file for complete search history.

(56) References Cited

U.S. PATENT DOCUMENTS

| | | | | |
|---|---|---|---|---|
| 494,013 | A * | 3/1893 | McCleave | 168/48.1 |
| 583,706 | A * | 6/1897 | Kearns et al. | 33/195 |
| 850,720 | A * | 4/1907 | Baldwin | 168/48.1 |
| 4,214,370 | A * | 7/1980 | Beaston | 33/195 |
| 5,027,520 | A * | 7/1991 | Finnegan | 33/195 |
| 5,996,698 | A * | 12/1999 | Behney | 168/48.1 |
| 6,907,670 | B1 * | 6/2005 | Teed | 33/195 |
| 2002/0144823 | A1 * | 10/2002 | Ahrens | 168/45 |

* cited by examiner

*Primary Examiner*—Michael J. Carone
*Assistant Examiner*—Elizabeth Shaw
(74) *Attorney, Agent, or Firm*—Mark Ogram

(57) ABSTRACT

A trim guide used by farriers for the hooves of animals. The trim guide has a shank with a bend. At one end of the shank is positioned an anchor, ideally configured as an "X". The anchor rests on the flexor tendons. A leveling bar is attached to the opposing end of said shank and forms a "T" with said shank. A leveling bulb is secured near or on the leveling bar allowing proper measurement on the level of the hoof to be easily determined.

20 Claims, 4 Drawing Sheets

TRIM GAUGE FOR FARRIERS

Priority for this application is claimed from U.S. Provisional Patent application Ser. No. 60/470,266, filed on May 13, 2003, and entitled "Trim Guide for Farriers".

BACKGROUND OF THE INVENTION

The present invention relates to tools for the farrier and more particularly to a trim gauge used by farriers.

The nailed on horseshoe was first used almost simultaneously in Siberia, Byzantium, and Germany in 890 A.D. While the nailed on shoe provided a great deal of protection for the horse, it still required a great deal of work to make sure the shoe itself was properly aligned for the leg and hoof of the horse, otherwise, the horse can be damaged.

Typically a trim gauge is made of steel and is slightly curved at the lower end. In use, the trim gauge is placed along the back of the leg and runs from approximately the center line of the flexor tendons down to the heel. A loop at the top of the gauge fits around the contour of the leg and holds the mechanism in place. A straight flat piece of steel at the end of the trim gauges s placed along the width of the heel.

The trim gauge is used to determine if the hoof has been trimmed level.

Unfortunately, the positioning of the trim gauge on the leg is subject to variation, thereby generating in accurate measurement. Also, since the trim gauge is not a measuring tool, documentation of the condition of the hoof afterwards is impossible; thereby exposing the farrier to later questions on the status of the hoof.

It is clear there is a need for a trim gauge which provides accurate measurements which are documentable.

SUMMARY OF THE INVENTION

The trim guide of the present invention has a shank portion which serves as a handle and which extends from an anchor to the "T" shaped leveling bar. The shank is bent at a slight angle to form to the natural curve found in the horse's lower leg.

The anchor at one end of the "T" permits the trim guide to rest on the flexor tendons to provide a first contact point.

The bar forms the top of the "T" has sufficient length to rest from one side of the hoof to the other. In this manner, the leveling bar forms the two other points of contact with the horse (the hoof in this case).

A leveling bulb or other such device, is positioned on the trim guide so that the level of the leveling bar is easily ascertained. The position of the leveling bulb is either in the shank or in the leveling bar itself.

It has been found the horse's hoof should be trimmed so that, when the hoof is raised into the "work" position by the farrier, the two sides of the hoof should be level. The leveling bulb allos an accurate measurement of the degree of level obtained by the farrier. In some embodiments, a slight "tilt" of the leveling bar is obtained by proper adjustment of leveling bulb so that it is slightly "off plumb".

Further, in the preferred embodiment of the invention, the top of the leveling bar is graduated so that easy measurement of the hoof is obtained. Also, in order to remind the farrier of the ideal width of the edge of the hoof, on the reverse side of the leveling bar is imprinted the ideal widths (for a horse under fourteen hands, one and half inches; over fourteen hands, one and three quarters inches; and for a draft horse, two and a quarter inches).

In this manner, using a single tool, the farrier is able to accurately gauge the condition of the hoof both before and after the shaping operation has been conducted.

The invention, together with various embodiments thereof, will be more fully explained by the accompanying drawings and the following descriptions thereof.

DRAWINGS IN BRIEF

FIGS. 1A, 1B, and 1C illustrate an embodiment of the invention.

FIGS. 2A, 2B, and 2C, are top, side, and anchor views of the preferred embodiment of the invention.

DRAWINGS IN DETAIL

Figure 1A:
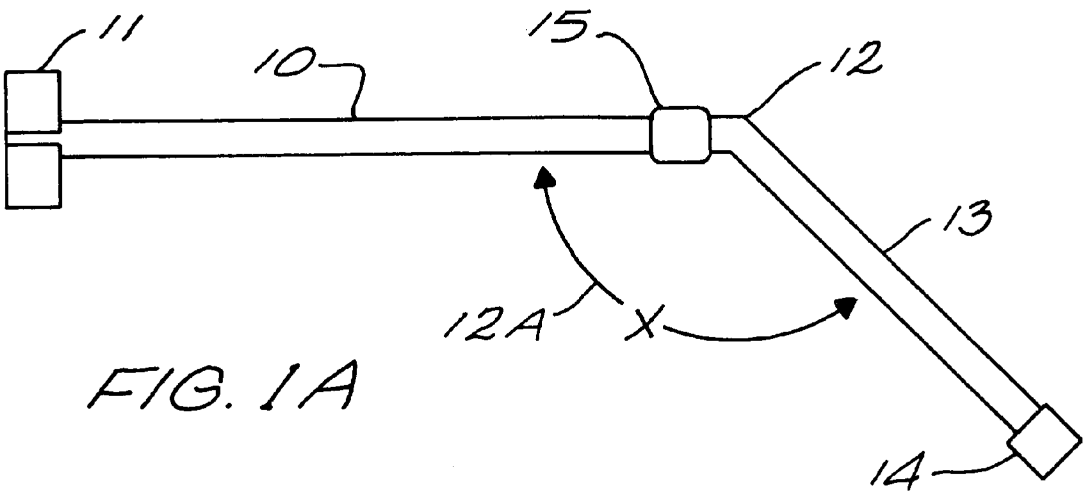
Figure 1B:
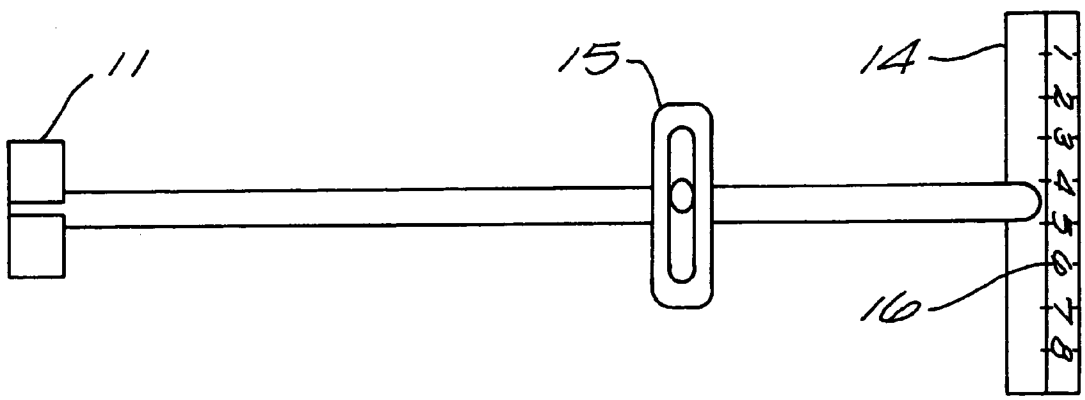
Figure 1C:
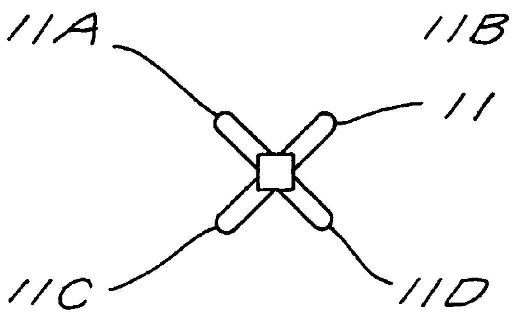

FIGS. 1A, 1B, and 1C, illustrates an embodiment of the invention. FIG. 1A is a side view; FIG. 1B is a top view; and FIG. 1C shows the anchor mechanism of the present invention.

Trim guide 10 has a central shaft with anchor 11 positioned at one end. The shaft bends into portion 13. Bend 12 has an angle X, 12A, of between 125 degrees and 165 degrees. Bend 12 permits trim guide 10 to avoid the fet lock.

At the opposing end of the trim guide 10 is the guide bar 14 which forms a "T" with shaft portion 13. Bar 16 is graduated into inches 16, thereby permitting the farrier to measure the width of the hoof (to obtain the properly sized horse shoe) and to measure the wall of the hoof (for recordation).

Level 15 in the shaft of the trim guide, is used by the farrier to assure that guide bar 14 is kept level during the measuring process. This assures that proper measurement is accomplished.

Anchor 11, in this embodiment, is formed by an "X" arrangement having prongs 11A, 11B, 11C, and 11D.

Figure 2A:
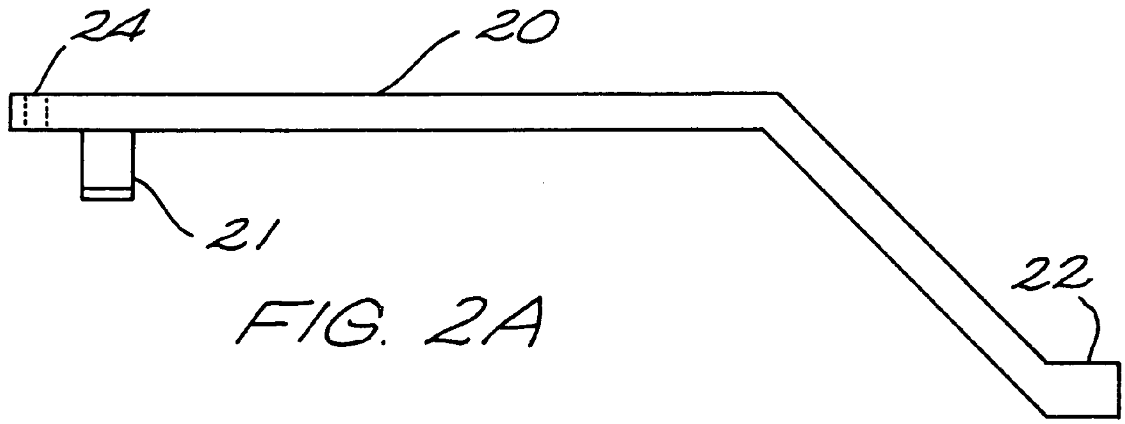
Figure 2B:
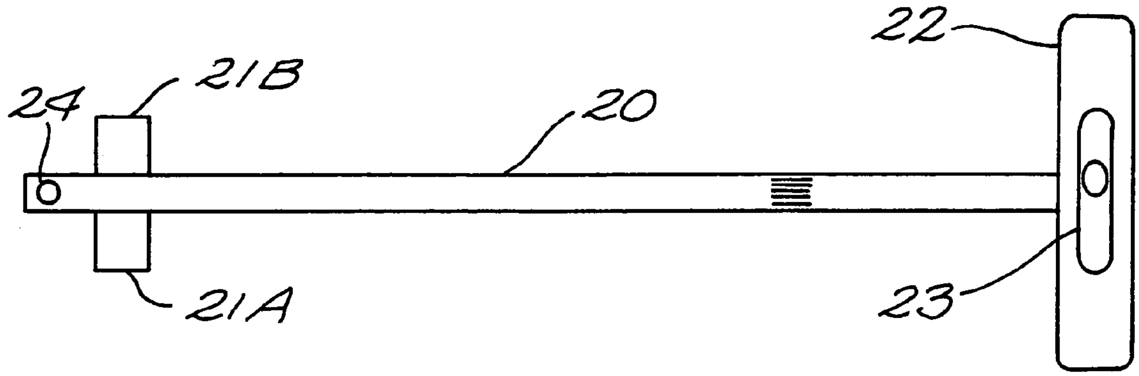
Figure 2C:
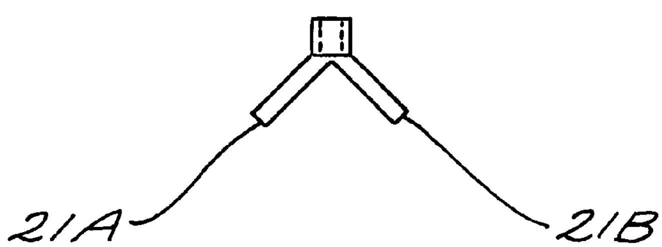

FIGS. 2A, 2B, and 2C, are top, side and anchor views of the preferred embodiment of the invention.

As with the embodiment of FIG. 1, trim guide 20 is bent between anchor 21 and guide bar 22. In this embodiment, level 23 is positioned within guide bar 22. Further, in this embodiment, hole 24 permits the trim guide 20 be easily stored by either hanging on a nail or on the belt of the farrier.

In this embodiment, anchor 21 is made up of two prongs 21A And 21B.

Figure 3A:
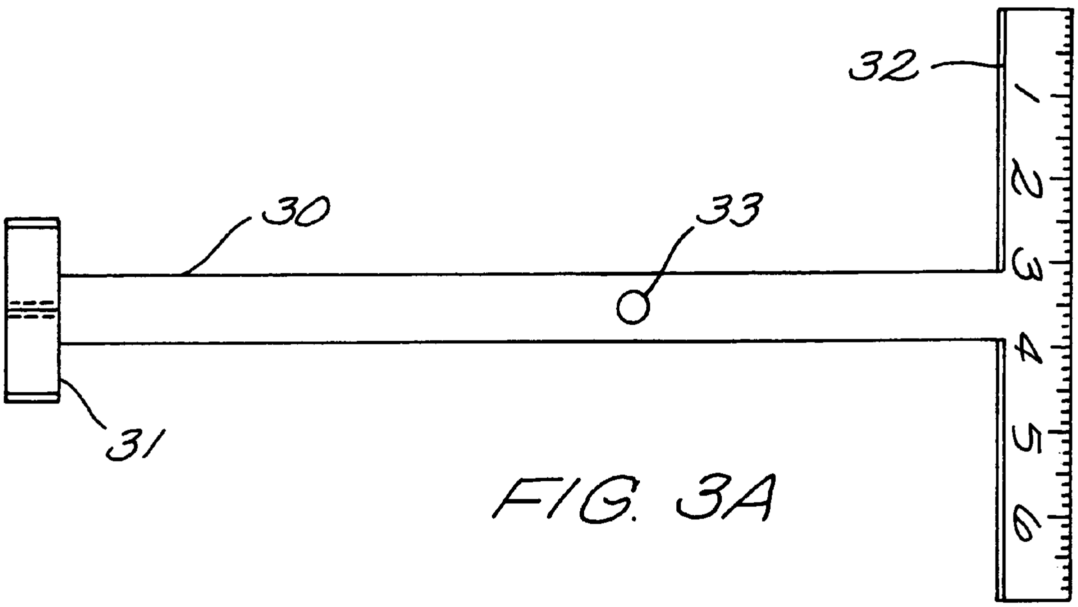
FIGS. 3A and 3B are top and side views of an embodiment of the invention.
Figure 3B:
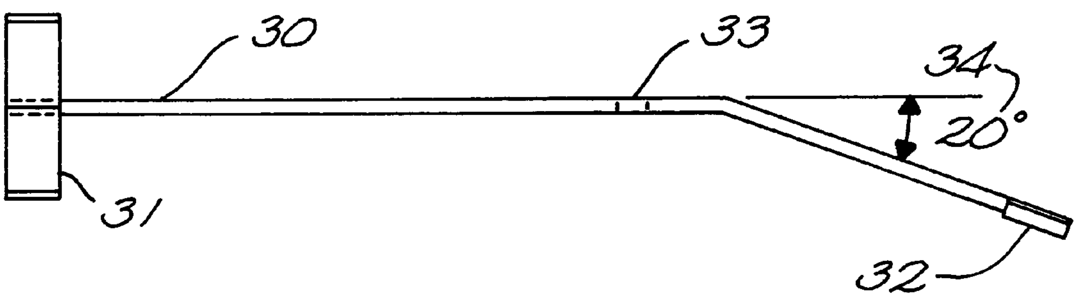

FIGS. 3A and 3B are top and side views of an embodiment of the invention.

Anchor 31 is connected to shank 30. In this embodiment, anchor 31 is shaped as an "X" so that it easily rests on the flexor tendon of the animal. Leveling bar 32 is located at the opposing end of shank 30 forming a "T" therewith.

In this embodiment, leveling bulb 33 is affixed to shank 30 and is used in the measurement as outlined above.

In this embodiment, shank 30 is bent at angle 34 being 20 degrees.

Figure 4:
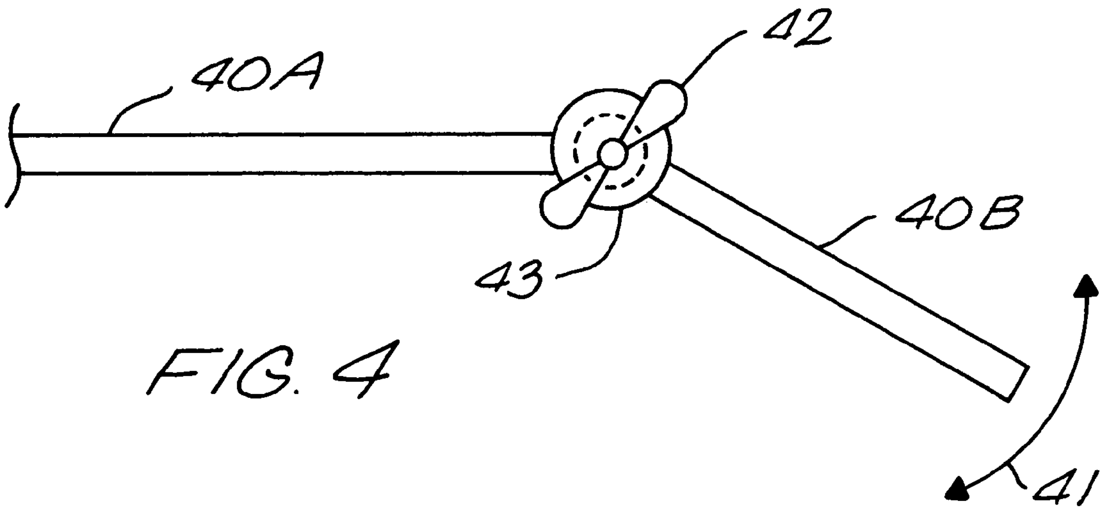
FIG. 4 is a side view of an embodiment of the invention in which the angle of bend for the shank is adjustable by the farrier.

FIG. 4 is a side view of an embodiment of the invention in which the angle of bend for the shank is adjustable by the farrier.

The shank is shown in two portions, 40A and 40B. Portion 40A is secured to portion 40B via locking nut 42 which is secured to lock ring 43. By releasing locking nut 42, lock ring 43 is free to rotate allowing portion 40B to move as indicated by arrow 41. Those of ordinary skill in the art readily recognize other mechanisms which will serve this purpose.

In this manner, the farrier is able to adjust the angle within the shank to meet differing needs or the preference of the farrier.

Figure 5A:
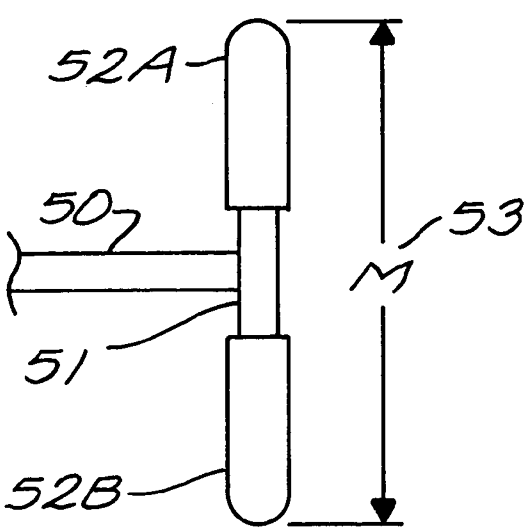
FIGS. 5A and 5B are top view of an embodiment of the invention in which the overall length of the leveling bar is adjustable.
Figure 5B:
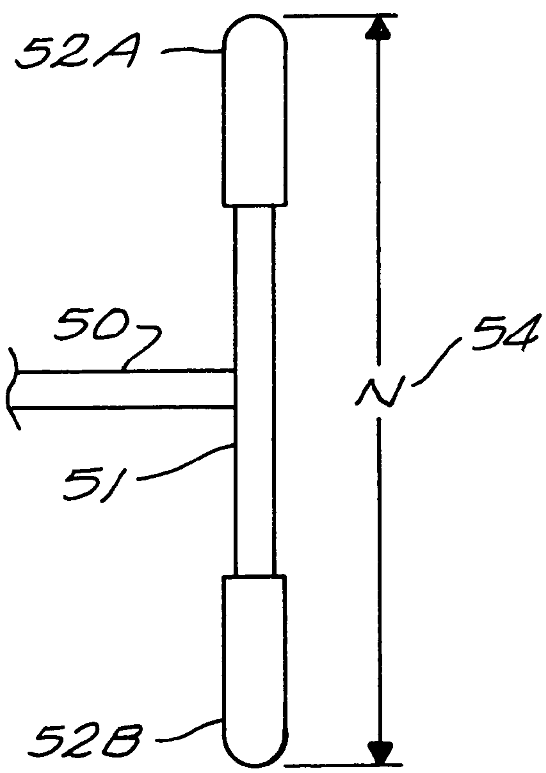

FIGS. 5A and 5B are top view of an embodiment of the invention in which the overall length of the leveling bar is adjustable.

Shank 50 is connected to leveling bar 51 in the "T" shape described above. In this embodiment, ends 52A and 52B are placed over the ends of leveling bar 51.

In FIG. 5*a*, ends 52A and 52B are moved inward so that the overall length created by the ends 52A and 52B with leveling bar 51 is M.

By moving ends 52A and 52B outward, the overall length 54 of the combination becomes N, which is greater than M. In this manner, the farrier is able to adjust the length of the leveling bar to meet the requirements of the specific animal.

It is clear from the foregoing that the present invention provides for a highly improved trim guide.

What is claimed is:

1. A trim guide for hooves of animals comprising:

a) a shank portion having a first end and a second end, said shank portion having a bend between the first end and the second end forming a first section and a second section;

b) an anchor portion attached to the first end of the shank portion and configured as an "X" to rest on a flexor tendon of the animal; and, c) a leveling bar attached to the second end of said shank portion and forming a "T" with said shank portion.

2. The trim guide according to claim 1, further including a leveling bulb secured to said leveling bar.

3. The trim guide according to claim 1, a) wherein the second section of said shank portion connects with said leveling bar; and, b) further including a leveling bulb secured to the second section of said shank portion.

4. The trim guide according to claim 3, wherein said first section and said second section of said shank portion form an angle from a true line of between ten degrees and forty-five degrees.

5. The trim guide according to claim 4, wherein said leveling bar is graduated for measurement purposes.

6. The trim guide according to claim 4, wherein a length of said leveling bar is adjustable to accommodate a width of the hoof.

7. A tool for farriers comprising:

a) a bent shank portion having a first end and a second end;

b) an anchor portion attached to a first end of the shank portion;

c) a leveling bar attached to a second end of said shank portion and forming a "T" with said shank portion; and, d) means for measuring a level of said leveling bar.

8. The tool for farriers according to claim 7, wherein said anchor portion is configured as an "X" to rest on the flexor tendons of an having a hoof.

9. The tool for farriers according to claim 7, wherein said means for measuring a level of the leveling bar includes a leveling bulb secured to said leveling bar.

10. The trim guide according to claim 7, wherein said means for measuring a level of the leveling bar includes a leveling bulb secured to said shank portion.

11. The tool for farriers according to claim 10, wherein said shank portion is bent to form an angle from a true line of between ten degrees and forty-five degrees.

12. The tool for farriers according to claim 11, wherein said leveling bar is graduated for measurement purposes.

13. The tool for farriers according to claim 11, wherein a length of said leveling bar is adjustable to accommodate a width of the hoof.

14. A trim guide for hooves of animals comprising:

a) a shank having a bend between a first end and a second end;

b) an anchor, configured as an "X" and attached to the first end of the shank;

c) a leveling bar attached to the second end of said shank and forming a "T" with said shank; and, d) means for measuring a level of said leveling bar.

15. The trim guide according to claim 14, wherein said means for measuring a level of said leveling bar includes a leveling bulb secured to said leveling bar.

16. The trim guide according to claim 14, wherein said means for measuring a level of said leveling bar includes a leveling bulb secured to the shank.

17. The trim guide according to claim 16, wherein said first section and said second section of said shank form an angle from a true line of between ten degrees and forty-five degrees.

18. The trim guide according to claim 17, wherein the angle of said shank is adjustable by a farrier.

19. The trim guide according to claim 17, wherein said leveling bar is graduated for measurement purposes.

20. The trim guide according to claim 17, wherein a length of said leveling bar is adjustable to accommodate a width of the hoof.

* * * * *